United States Patent [19]

Nelson

[11] E Re. 30,008

[45] Reissued May 22, 1979

[54] FACSIMILE APPARATUS AND METHOD OF OPERATION

[75] Inventor: Richard L. Nelson, New York, N.Y.

[73] Assignee: Exxon Research & Engineering Co., Florham Park, N.J.

[21] Appl. No.: 777,678

[22] Filed: Mar. 15, 1977

Related U.S. Patent Documents

Reissue of:

[64] Patent No.: 3,872,239
Issued: Mar. 18, 1975
Appl. No.: 333,616
Filed: Feb. 20, 1973

[51] Int. Cl.[2] ..... H04N 1/08

[52] U.S. Cl. ..... 358/291; 346/24; 346/138; 358/280; 358/286; 358/289

[58] Field of Search ..... 358/280, 286, 289, 291; 346/24, 138

[56] References Cited

U.S. PATENT DOCUMENTS

| | | | |
|---|---|---|---|
| 1,052,940 | 2/1913 | Morris | 346/138 |
| 1,272,960 | 7/1918 | Jay | 346/138 |
| 1,676,848 | 7/1928 | Au | 346/138 |
| 1,735,894 | 11/1929 | Coombs | 40/306 |
| 1,883,421 | 10/1932 | Stevens | 428/40 |
| 2,096,351 | 10/1937 | Semonsen | 24/17 R |
| 2,113,655 | 4/1938 | Kellie | 346/138 |
| 2,145,072 | 1/1939 | Cooley | 358/291 |
| 2,710,191 | 6/1955 | Williams | 346/138 |
| 3,184,540 | 5/1965 | Murphy | 358/257 |

FOREIGN PATENT DOCUMENTS 1177474 1/1970 United Kingdom.

*Primary Examiner*—Howard W. Britton
*Attorney, Agent, or Firm*—N. L. Norris

[57] ABSTRACT

A facsimile transceiver comprising a document/copy receiving drum, a motor for rotation of the drum about the drum axis and a read/write head mounted for linear movement in a direction parallel with the drum axis. When the transceiver is operating in the receive mode, the copy medium having adhesive along at least one edge circumscribes the drum in a closed loop so as to eliminate the necessity for transmitter-receiver angular synchronizing signals which would otherwise be required for locating the copy margin adjacent the edge of the copy paper. After completion of a transmission, the copy medium is severed along a line so as to provide an appropriate margin for the copied information content. In one embodiment of the invention, the closed loop is formed from a single sheet having adhesive along one edge for purposes of forming a bond between opposite edges of the sheet when the sheet is applied to the drum. The read/write head includes a cutting wheel which is adapted to sever the sheet along the appropriate line when the head is moved in a cutting stroke along the length of the drum with the cutter wheel in contact with the sheet. In another embodiment, the copy paper includes tear strings displaced along its back surface running parallel to the axis of the drum and of sufficient number so that a tear string for shearing the copy paper loop is likely to be near the margin of the copy.

22 Claims, 28 Drawing Figures

Fig. 3
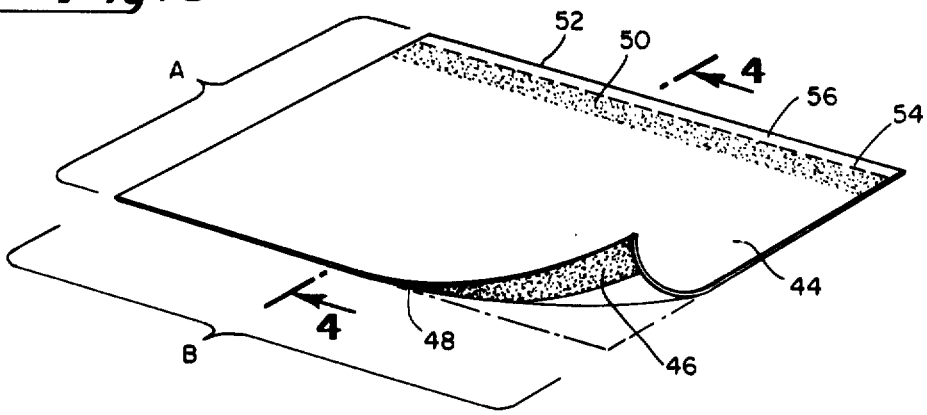
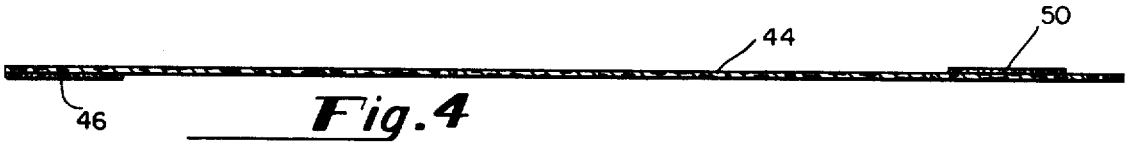
Fig. 4
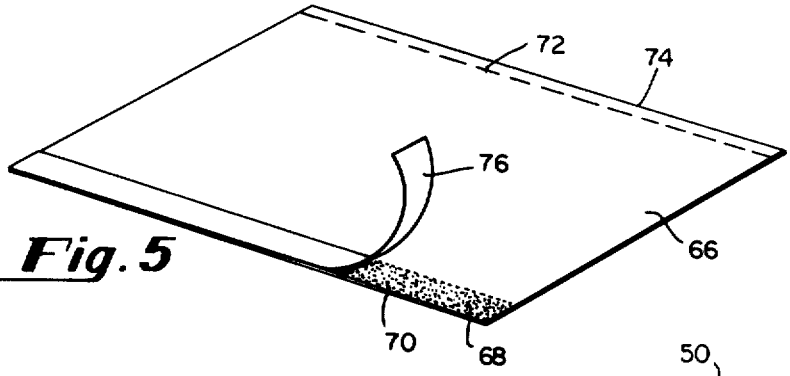
Fig. 5
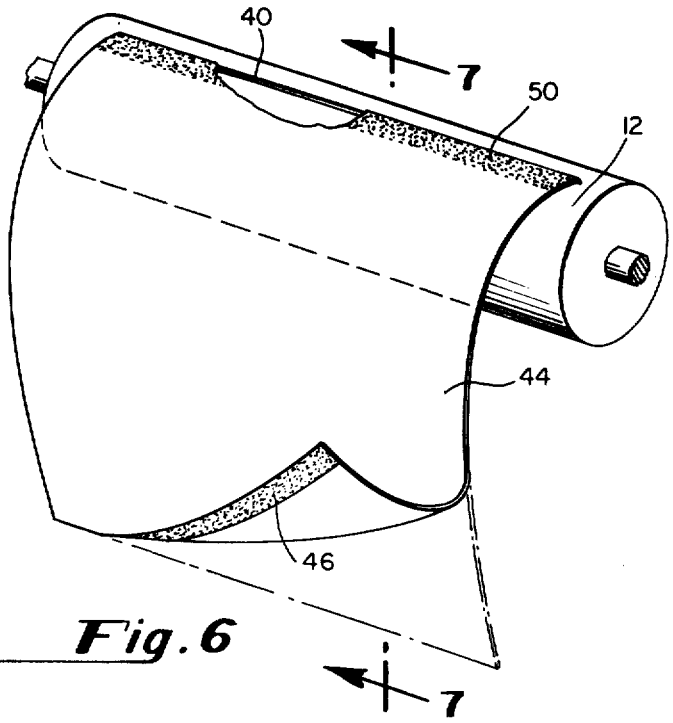
Fig. 6
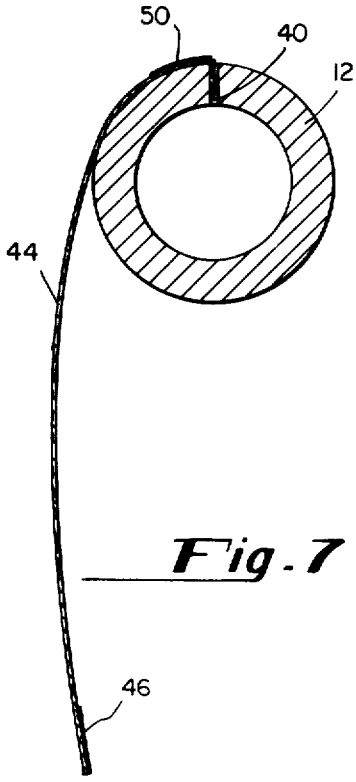
Fig. 7

Fig. 8
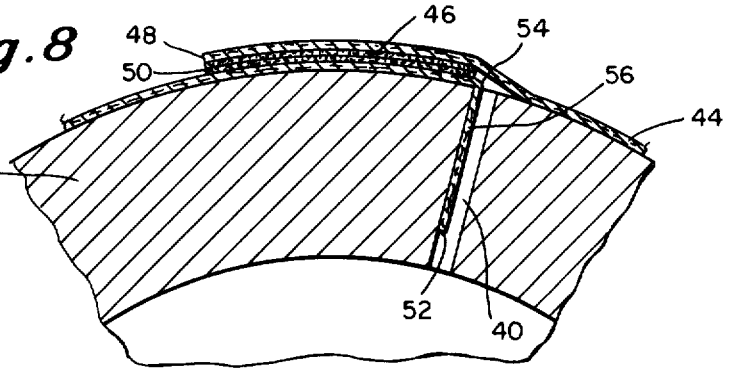
Fig. 9
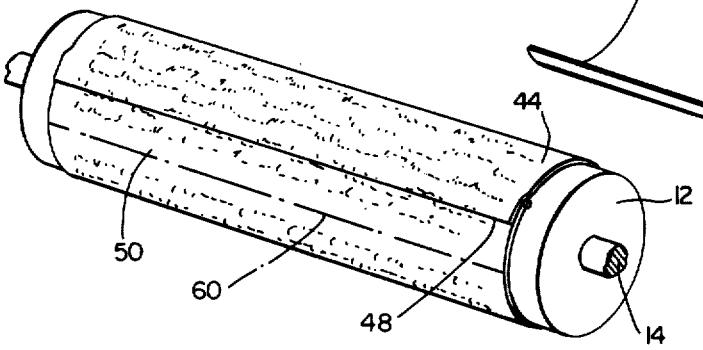
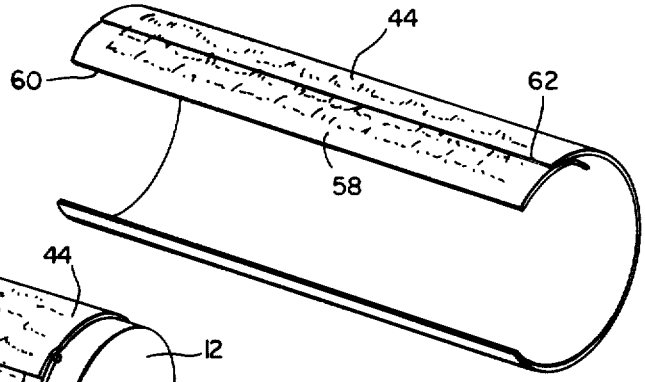
Fig. 10
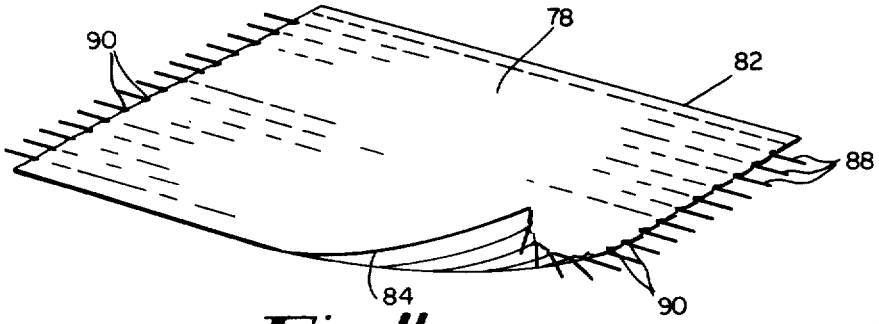
Fig. 11
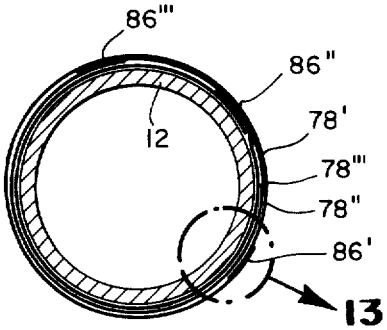
Fig. 12
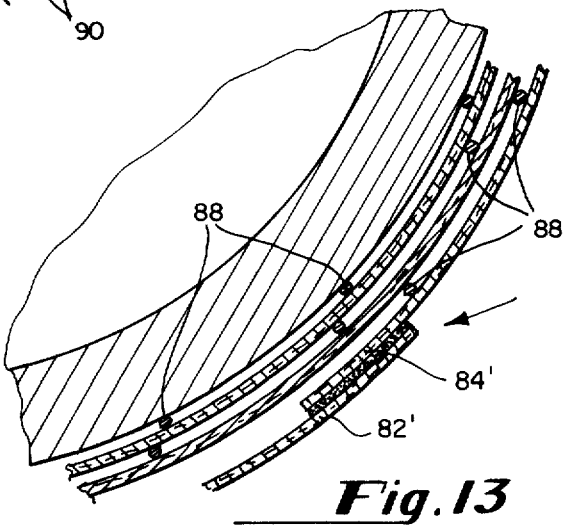
Fig. 13

FACSIMILE APPARATUS AND METHOD OF OPERATION

Matter enclosed in heavy brackets [ ] appears in the original patent but forms no part of this reissue specification; matter printed in italics indicates the additions made by reissue.

RELATED APPLICATIONS

Certain aspects of the facsimile apparatus disclosed herein are also disclosed in my copending application Ser. No. 336,615 filed Feb. 20, 1973 now abandoned in favor of continuation-in-part application Ser. No. 412,989 filed Nov. 5, 1973, a copending application of Luther R. Winters, Jr. Ser. No. 332,927 filed Feb. 16, 1973 and a copending application of Herbert P. Ford, Jr. Ser. No. 332,925 filed Feb. 16, 1973, assigned to the assignee of this invention.

BACKGROUND OF THE INVENTION

This invention relates to facsimile systems comprising a transmitter, a receiver and a communications network such as telephone lines therebetween. The transmitter employs a scanning or reading element which reads the information content of an original document. The original document is moved relative to the reading means such that successive paths are scanned whereupon the output of the scanning element is fed to a device such as a photodetector which converts the variations in light intensity received by the scanning element due to variations in the reflectivity of the scanned document to electrical signals. These electrical signals then convey information concerning the radiation absorption, emission or reflection of the scanned document. The electrical information-bearing signals are then transmitted to a receiving unit over suitable means such as a telephone network where the receiving unit converts the electrical information-bearing signals from the transmitting unit to marks or images on a receiving copy medium so that the received copy is a reasonable facsimile of the original scanned document.

In one type of conventional facsimile system, the copy medium comprises a sheet of paper which is applied to the receiving drum with opposite edges of the paper abutting or overlapping so as to form an open loop having a discontinuous copy medium surface. In order to assure that the margin of the copy is appropriately located with respect to the edge of the sheet, angular synchronizing signals are utilized. These signals assure that the position of the document edge passes the reading head of the transmitter at the same time that the copy edge passes the writing head of the receiver, and this in turn assures the proper location of the copy margin with respect to the edge of the copy sheet. In other words, the copied matter is placed on the copy sheet in substantial conformance with its location on the document being copied.

U.S. Pat. No. 3,582,550—Latanzi is illustrative of the complexity which is involved in maintaining synchronization between transmitter and receiver drums in prior art systems. In this particular prior art system, a variable frequency generator drives the drum motor at the receiver in response to an error signal indicative of the relative positions and speeds of the transmitter and receiver drums. An elaborate clutch mechanism is shown in U.S. Pat. No. 3,569,628—Okleshen which is utilized in effecting synchronous phase operations between a transmitter and a receiver. These synchronizing arrangements add expense to a facsimile system as well as making it difficult to increase the rate of transmission.

SUMMARY OF THE INVENTION

It is an object of this invention to provide a relatively low cost facsimile system.

It is a more specific object of this invention to provide a relatively low cost facsimile system by eliminating the necessity for synchronizing signals.

In accordance with this invention, a facsimile system comprises a transmitter, a receiver and a communications network coupling the transmitter to the receiver. The transmitter includes reading means for detecting the information content of an original document, transmitter scanning means for moving the original document relative to the reading means along successive scanning paths and signal transmission means responsive to the reading means for generating signals representative of the information content of the original document. The receiver includes means for writing on a copy medium, receiver scanning means for moving the copy medium relative to the writing means along successive scanning paths and signal receiving means responsive to the signals generated by the signal transmission means for activating the writing means to reproduce the information content of the original document on the copy medium. In order to eliminate the necessity for synchronizing the initial position of the original document with respect to the reading means and the initial position of the copy medium with respect to the writing means, the copy medium comprises a closed or endless loop of material moving relative to the writing means such that a continuous writing surface is juxtaposed to the writing means. In accordance with one important aspect of the invention, the receiver scanning means may comprise a substantially cylindrical drum rotatable about the axis thereof with the copy medium forming the closed loop around the cylindrical surface of the drum. A similar drum may be utilized for the transmitter scanning means where the original document forms an open loop around the cylindrical surface of that drum. By utilizing synchronous motors to drive the drums, sufficient speed synchronism between the drums of the transmitter and receiver may be maintained during scanning.

In accordance with another important aspect of the invention, the receiver may comprise means for severing the copy medium along a line parallel to the axis of the drum so as to appropriately locate the margin of the copy with respect to the edge of the paper. In other words, the severing of the copy medium permits the information on the copy medium to be appropriately positioned or centered on the severed copy sheet. In one preferred embodiment of the invention, the scanning means comprises a head which moved along a linear path parallel to the axis of the drum. The head includes cutting means which may be moved into cutting engagement with the copy medium and then moved along the copy medium with the head. In order to permit the head to be moved through a cutting stroke, means are provided which permit the head to slide along the linear path independent of the drive mechanism. The surface of the drum is provided with a plurality of linear grooves extending parallel with the axis of the drum so as to provide a guide for the cutting roller carried by the head. By providing a sufficient number of grooves, the cutting means can be aligned with one of the grooves so that the copy medium is severed along a line to assure the proper location of the copy margin with respect to the edge of the paper. The drum may also comprise a pliable or soft surface providing means to allow the cutter to penetrate and sever the copy medium.

In accordance with still another important aspect of the invention, the copy medium comprises a sheet of material adapted to be marked by the writing means of the receiver. The sheet includes adhesive means carried adjacent one edge thereof so as to permit the formation of an adhesive bond between areas adjacent opposite edges of the sheet when the areas are overlapped to form a closed loop. A line of weakness may be provided along one edge of the sheet to facilitate folding thereof and thereby permit the portion of the sheet located between the line of weakness and its adjacent edge to be inserted into a clamp or slot of the receiver drum.

BRIEF DESCRIPTION OF THE DRAWINGS

FIG. 3 is a perspective view of a sheet of copy paper having self-bonding adhesive on both sides which may be utilized in the transceiver of FIGS. 1 and 2;

FIG. 4 is a sectional view taken alone line 4—4 of FIG. 3;

FIG. 5 is a perspective view of another embodiment of the sheet of copy paper wherein an adhesive strip is provided on only one side of the copy paper;

FIG. 6 is a perspective view of the copy paper of FIG. 3 being applied to the cylindrical drum of the transceiver shown in FIGS. 1 and 2;

FIG. 7 is a cross-sectional view taken along line 7—7 of FIG. 6;

FIG. 8 is an enlarged partial cross-sectional view of the paper and clamping slot shown in FIG. 6;

FIG. 9 is a perspective view of the copy medium secured in a closed loop around the drum shown in FIGS. 1 and 2 with copied information thereon;

FIG. 10 is a perspective view of the copy medium shown in FIG. 9 after severing and removal from the drum;

FIG. 11 is a perspective view of another type of closed loop copy medium which may be utilized in accordance with this invention;

FIG. 12 is a cross-sectional view of the copy medium of FIG. 11 secured in a closed loop around the drum shown in FIGS. 1 and 2;

FIG. 13 is an enlarged view of a portion of FIG. 12;

DETAILED DESCRIPTION OF A PREFERRED EMBODIMENT

Figure 1:
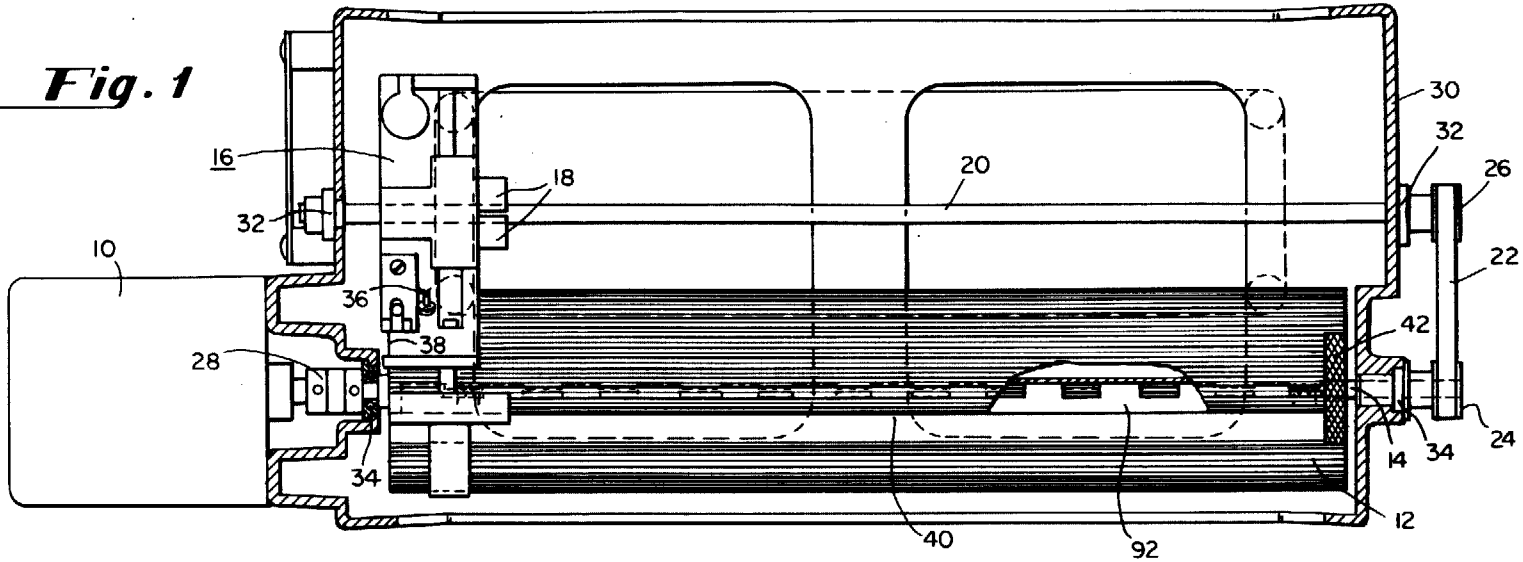
FIG. 1 is a top plan view of a facsimile transceiver constructed in accordance with the invention.
Figure 2:
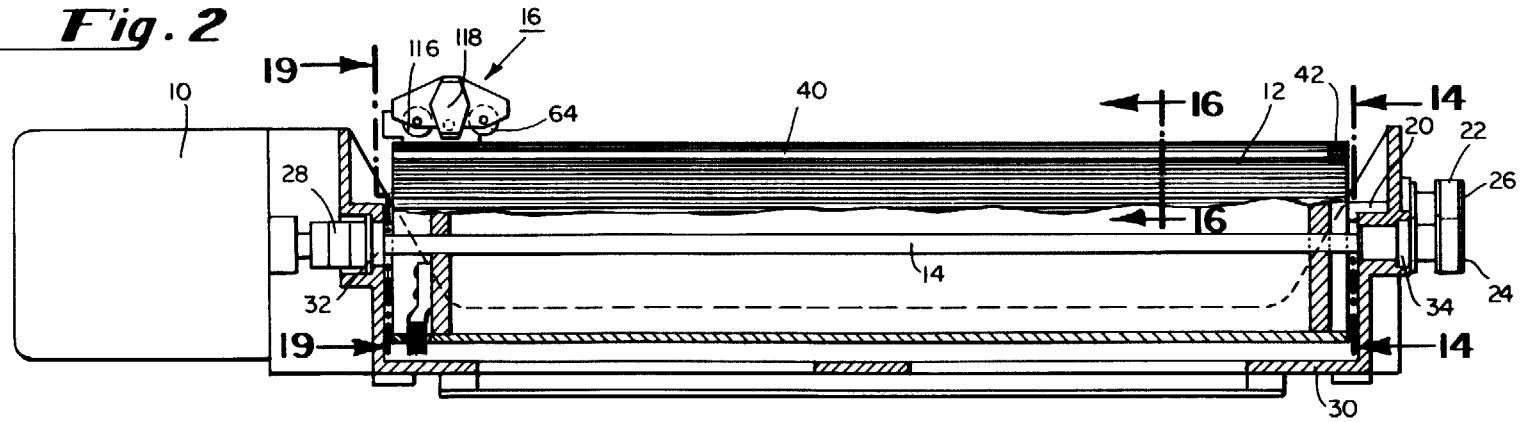
FIG. 2 is a front view of the transceiver shown in FIG. 1.
Figure 18:
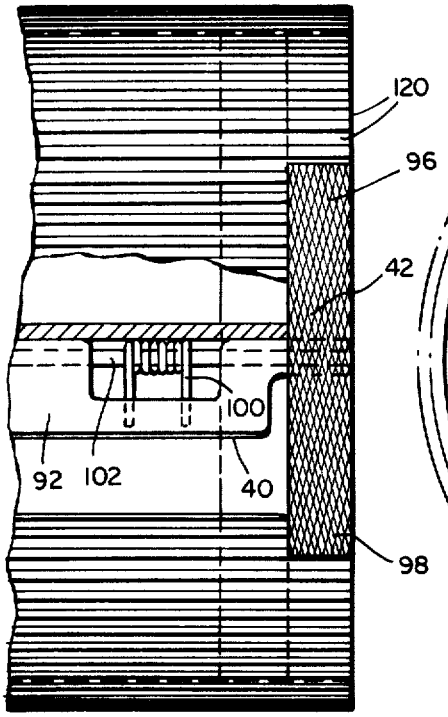
FIG. 18 is an enlarged fragmentary view of the end of the transceiver drum with the copy clamp in the closed position.
Figure 14:
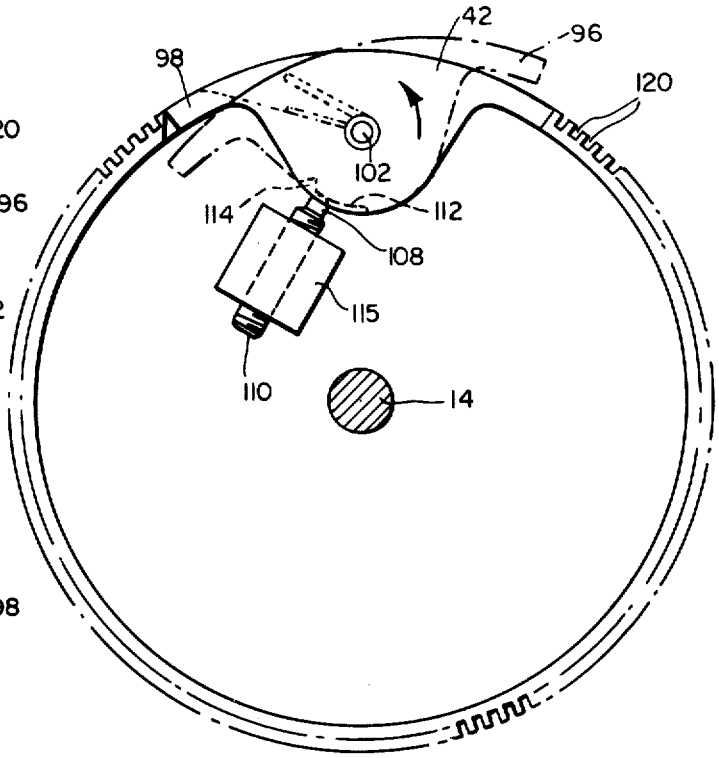
FIG. 14 is a sectional view of the facsimile transceiver shown in FIG. 2 taken along section line 14—14.

Referring to FIGS. 1 & 2, a facsimile transceiver comprises a synchronous motor 10 which drives a document/copy receiving drum 12 rotatably about a drum shaft 14 which extends along the drum axis while also driving a scanning head 16 along a substantially linear path parallel to the drum axis. The head is advanced along the linear path by the cooperation between a head drive mechanism 18 and a shaft 20 which is located rearwardly of and parallel to the drumshaft and is also driven by the motor 10 via a belt 22 which couples the shaft 20 to the shaft 14. Pullies 24 and 26 secured to the shafts 14 and 20 respectively are provided for the belt 22, while a flexible coupling 28 connects the motor drive shaft of the motor 10 to the shaft 14. The motor 10, the drum 12 and the head 16 are supported for rotation on a molded U-shaped frame 30 wherein the head shaft 20 and the drum shaft 14 are journaled in bearings 32 and 34 respectively.

In accordance with an important aspect of the invention shown and described in the aforesaid copending application Ser. No. 333,615, the head 16 shown in FIGS. 1 and 2 is a read/write head giving the transceiver the dual capability of transmitting information scanned by the head on an original document applied to the drum 12 while also having the capability of receiving and then writing on a copy medium secured on the drum 12 as the head 16 scans in a direction parallel with the axis of drum rotation. More particularly, the head 16 comprises an optical scanner including a bundle of fiber optics 36 which extends through an opening into close proximity with the surface of the drum 12. The fiber optics serve to detect light-dark variations in the original document applied to the drum when the transceiver is operating in the transmitting mode. The head 16 also includes a stylus 38 which extends into contact with an electrosensitive copy medium carried by the drum so as to mark the copy medium in accordance with a received information-bearing signal applied to the transceiver when operating in the receiving mode.

In accordance with this invention, the copy medium applied to the drum 12 forms a closed or endless loop thereabout so as to eliminate the necessity for synchronizing the initial relative angular position of the original document on a transmitting transceiver drum with respect to the initial relative angular position of the copy medium on a receiving transceiver drum 12. In this connection, the drum 12 includes an axial slot 40 which extends for the entire length of the drum 12 at the periphery thereof. The slot 40 has a clamping mechanism associated therewith which will be described in somewhat greater detail subsequently, which clamping mechanism is opened and closed by a finger engagable member 42. The nature of the copy medium which is inserted into the slot 40 with the capability of forming a closed loop of continuous copy medium will now be described in substantial detail.

Referring to FIGS. 3 and 4, the copy medium applied to the drum comprises a sheet of paper 44 having a width A slightly larger than the circumference of the drum 12 and a length B slightly smaller than the length of the drum 12. The paper 44 includes on one face a strip of adhesive material 46 which is located immediately adjacent a first edge 48 which extends along the length of the paper 44. This adhesive material may be a contact adhesive which bonds when brought into contact with the opposite side and edge of the paper or itself. Preferably, it is characterized by bonding only to a like material. Another adhesive strip 50, slightly narrower than the strip 46, is located adjacent the opposite edge 52. Adhesive strip 50 is located on the opposite face of the paper 44 and spaced slightly back from the edge 52 behind a perforated line of weakness 54. The adhesive strip 50 comprises the same material as the strip 46 and therefore will only stick to the adhesive strip 46.

The paper 44 may be easily applied to the drum 12 as depicted in FIGS. 6, 7 & 8 by inserting the strip 56 between the perforated line 54 and the edge 52 into the slot 40 so that the line 54 aligns with the near edge of the slot 40 and wrapping the paper 44 around the drum 12 until the adhesive strip 46 is brought into overlapping contact with the adhesive strip 50. As shown in FIG. 8, when the paper is placed in circumscribing relationship around the drum 12, the strips 46 and 50 will be disposed in overlapping relationship and the extra width of the strip 46 will insure that none of the adhesive 50 is exposed and permit clamping in the slot 40 to assure that the paper is secured in proper place on the drum 12. The perforations 54 not only provide means of conveniently bending the strip 56 so as to allow for easy insertion into the slot 40, but also provide a means for aligning paper 44 by aligning the perforations 54 with the near or forward edge of the slot 40. Of course, the perforations may be replaced by a score line, printed line or other suitable means or marking or weakening the paper 44 along that line so as to facilitate clamping and proper alignment of the paper on the drum 12.

Once the paper has been applied to the drum 12 and the strip 46 has been bonded to the strip 50 as best shown in FIG. 8, the transceiver of FIGS. 1 and 2 may be placed in the receive mode and the message received from the transmitting transceiver. When the transmission of the information is complete as depicted in FIG. 9, the sheet 44 may be cut along an appropriate line 60 so as to properly center the information content on the sheet 44, i.e., locate the edge of the paper so as to provide a suitable margin 58 shown in FIG. 10 at the resulting edge 60 of the sheet 44 as shown in FIG. 10. The sheet 44 will have a seam 62 where the adhesive strips 50 and 46 overlap, which corresponds to the original paper edge 62. However, this seam is not considered objectionable since the copy medium may be written on adjacent and even over the seam 62. The strip 56 may be removed by tearing along the perforations 54.

In another embodiment shown in FIG. 5, the copy medium comprises a sheet 66 having a single strip of adhesive material 68 located immediately adjacent edge 70 while the perforated line of weakness 72 is located adjacent the opposite edge 74. In this particular embodiment, the adhesive strip 68 is capable of forming a bond with different materials. Accordingly, in order to prevent the strip 68 from sticking inadvertently to another surface, a protective covering 76 which may comprise plastic or some other readily removable material such as wax paper is provided. The covering 76 may then be removed just prior to applying the sheet 66 to the drum 12.

In FIGS. 11–13, another type of copy medium is shown comprising a plurality of sheets 78 which are wrapped around the drum 12 so as to provide a magazine or cassette and avoid the need for separate sheets of copy paper being applied to the drum each time the transceiver is utilized in the receiving mode. The sheets 78 of the copy medium (three sheets being shown in FIGS. 12 and 13 for purposes of illustration) are secured about the drum 12. Each sheet is provided with adhesive material which may be arranged as described in either of the embodiments heretofore discussed. Thus, as shown in FIG. 13, the first sheet 78′ is wrapped around the drum 12 with the opposite edges 82′ and 84′ overlapping and at least one surface of the sheet 78′ carrying adhesive forming a bond at a location generally designated at 86′. An edge of the next sheet 78″ is then wrapped around the sheet 78′ with the opposite edges 82″ and 84″ overlapping to form an adhesive bond generally designated as 86″ which is angularly displaced with respect to the adhesive bond 86′. The same is true with respect to the third sheet 78‴ and any subsequent sheets which are applied to the magazine or cassette. To prevent slippage between the sheets 78′, 78″, and 78‴, adhesive may be utilized between the sheets.

To facilitate the proper location of the margin for each sheet 78, each sheet is provided with a plurality of tear strings 8 on one side thereof as best shown in FIG. 13. The strings extend in the direction which corresponds to the drum axis when the sheet is secured to the drum. After a copy medium is filled with information content at the completion of a transmission, an appropriate tear string 88 may be pulled so as to center the information content on the sheet 78. These tear strings may be bonded to the paper by suitable adhesive means. To facilitate tearing of each sheet of paper, opposing edges of each sheet may include a plurality of spaced V-shaped grooves or notches 90 corresponding to the location of the tear strings 88. Thus, the initial pulling on the tear string to form the desired margin will be facilitated since the initial pulling of the string will be aligned with the apex of the notch and thus avoid inadvertent tearing of the paper. A cylindrical support (not shown) may be provided between the drum 12 and the sheets 78, in order to form a complete magazine for insertion on the drum. Note also that a hybrid copy medium utilizing adhesive along at least one edge and tear strings may be provided. Such a sheet could be applied to a drum individually or with others so as to form a magazine.

In another embodiment of the invention, the magazine of paper may comprise a continuous sheet of paper wrapped in spiral fashion about the cylindrical magazine support member. In this embodiment, the single sheet of paper would be rolled on the support member or the like in a continuous spiral to form as many standard sheets of copy paper as may be desired on a single magazine. The initial edge of the paper might be bonded to the drum by adhesive or the like, and a similar bond might be used between each layer of paper circumscribing the drum. Tear strings or perforations or the like may be provided along the one side of the paper at intervals corresponding to a sheet and extending in the direction of the drum axis to facilitate removal of each sheet of paper at its margin once the imprinted matter is disposed thereon. In this particular embodiment, angular synchronizing would be required to insure that the margin of the received copy corresponds to the margin of the transmitted matter at the position of the tear string.

Figure 16:
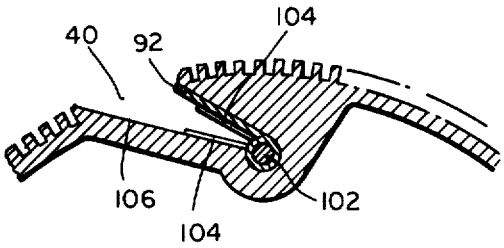
FIG. 16 is a sectional view of the drum shown in FIG. 1 taken along section line 16—16 with the copy clamp closed.
Figure 17:
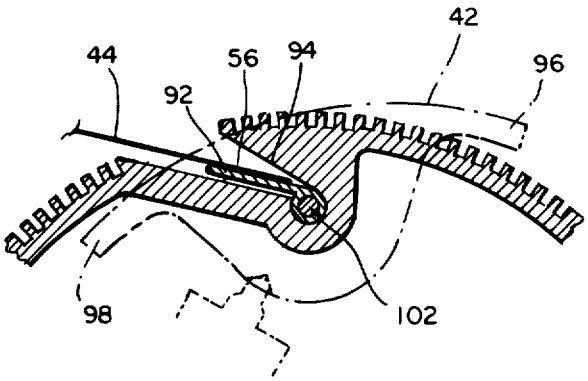
FIG. 17 is a sectional view of the transceiver drum shown in FIG. 2 taken along section line 16—16 with the copy clamp open.

As mentioned previously, the drum 12 comprises a slot 40 having a clamping mechanism for receiving an edge of a copy medium sheet so as to hold it in the proper position on the drum 12. Reference will now be made to FIGS. 14 and 16–18 for a more detailed description of the clamping mechanism. As shown in FIG. 17, a movable clamping member 92 which extends axially in the slot 40 along a substantial portion of the drum so as to receive an edge of a copy medium sheet when in the open position, e.g., portion 56 of the sheet 44. The clamping member 92 is pivotally mounted on a shaft 102 at the base of the slot 40 and is movable between open and closed positions. In the open position, the finger engagable member 42 assumes the position shown in broken lines in FIGS. 14 and 17. Once the portion 56 is in place between the movable clamping member 92 and the upper clamping surface 94 of the drum slot 40, the member 42 may be depressed at the end 96 to urge the movable clamping member 92 upward against the clamping surface 94 to hold the strip 56 of the sheet 44 therebetween. The closed position of the clamp is depicted in FIG. 16 absent the sheet 44. In order to release the sheet 44 from the clamping mechanism, the other end 98 of the finger engageable member 42 may be depressed so that the clamping mechanism assumes the open position shown in FIG. 17.

In order to maintain the clamping mechanism in its closed position, the clamp 92 is biased upward by a conventional spring member 100 which is carried by the shaft 102. One arm 104 of the spring 100 presses upward against the under side of the movable clamping member 92 and the other arm 104 presses downward against the bottom or lower slot surface 106 thereby forcing the clamping member 92 up against the slot surface 94. However, by pushing on the end 98, detent 108 carried at the end of an adjustable screw 110 slidably engages a groove 112 on the lower or interior side of the clamping member 92 and, as the end 98 is depressed further, it will lock in place in a depression 114. This depression 114 is of sufficient depth to hold detent 108 in place so that the clamping mechanism is held open even though the spring 100 tends to urge it closed. Only when pressure is applied to the end 96 of the clamping member 42 will the member 42 move in a manner so that the detent 108 disengages from the depression 114. The detent 108 is adjustable in relation to the depression 114 by adjusting the position of the screw 110 in a mounting block 115 carried by the frame. In this manner, an edge of the copy medium may be clamped into place in the slot along an edge thereof. It will of course be appreciated that other clamping mechanisms may be used.

Figure 19:
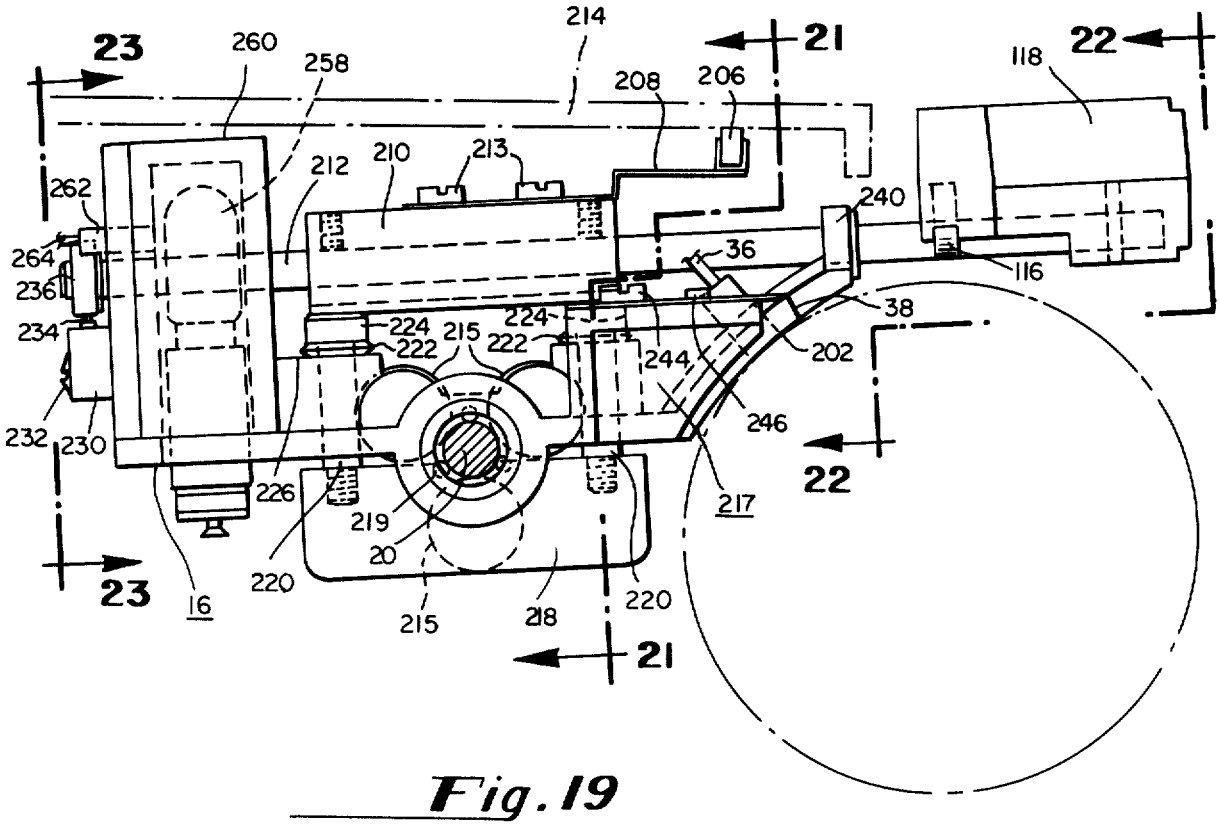
FIG. 19 is a side view of the scanning head for the transceiver shown in FIG. 2 taken along line 19—19.

In accordance with another important aspect of this invention, cutting means comprising a cutting roller 64 (a blade might also be utilized) is rotatably carried by the head 16. As best shown in FIG. 2, the head includes the cutting roller 64 as well as an opposite relatively soft roller 116. In the receiving or transmitting mode, the head 16 will advance in an axial direction with neither the cutting roller 64 nor the soft roller 116 in contact with the copy medium or original document carried by the drum. By manually twisting a head knob 118 which projects forward from the head 16, the cutting roller 64 or the roller 116 may be selectively brought into contact with the copy medium. By twisting in a clockwise direction, the cutting surface of the roller 64 is brought into contact with the copy medium to allow the roller 64 to engage and sever the copy medium as the head 16 is moved manually or automatically in an axial direction along the shaft 102. Prior to severing the copy medium, the drum must be rotated to a position so that the cutting roller 64 will engage the copy medium along a line which will establish an appropriate margin for the information content on the copy medium. If the knob 118 is rotated in a counterclockwise direction, the roller 116 will be brought into contact with the copy medium. As shown in FIG. 19, the roller 116 is rather broad so as to ride easily along the surface of the copy medium on the drum 12.

In order to assist in guiding the cutting roller 64 along a straight line so as to provide a suitable edge for the copy medium after severing, the drum 12 comprises a plurality of peripheral surface grooves 120 which extend axially along the drum. By providing a close and frequent spacing between the grooves 120, it is possible to sever the copy medium along any one of the number of closely spaced lines. This assures that the copy medium may be severed along a line so as to establish a suitable margin for the information on the copy medium.

Figure 15:
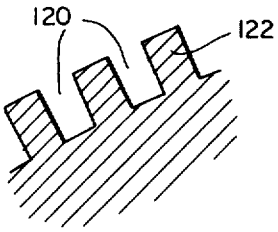
FIG. 15 is an enlarged view of the grooves in the surface of the drum shown in FIG. 14.

As shown in FIG. 15, the grooves 120 are separated by blunt projections 122. It will of course be appreciated that the projections 122 as well as the relatively flat bases of the grooves 120 may have a different configuration, e.g., V-shaped, although this particular configuration is deemed to be desirable since it does provide good shearing action for the cutter wheel when the wheel is pushed along the drum axis in grooves 120 by maximizing the surface area supporting the copy medium.

To permit the cutting roller 64 to advance freely across and thereby sever the copy medium, a novel head drive mechanism is utilized which is the invention of Luther R. Winters, Jr. and the subject matter of the aforementioned copending application Ser. No. 332,927. This drive mechanism and other novel aspects of the head fully disclosed in the aforesaid copending application will now be discussed in detail with reference to FIGS. 19–24.

In accordance with the invention of the aforesaid application, the head 16 is driven by and mounted on the single drive shaft 20. The head is then rotatably biased to a position of engagement between arcuate surface 202 of the head member which also carries the bundle 36 of fiber optics. Since the arcuate surface 202 is maintained in contact with the document carried by the drum 12, the spacing between that surface 202 and the document is fixed and consequently the distance between the ends of the fiber optics 36 and the surface 202 is thereby fixed. The critical distance between the ends of the fiber optics and the document being scanned is thereby maintained so as to optimize the scanning of the document in accordance with my invention described in aforementioned copending application Ser. No. 333,615.

In order to rotatably bias the arcuate surface 202 into contact with the document carried on the drum 12, a roller 206 is carried by a resilient arm 208 which is attached to a cam member 210 coupled to a head control shaft 212 which extends generally perpendicularly to the axis of the drum 12 and the drive shaft 20. The resilience of the arm 208 which is attached to the cam 210 by threaded fasteners 213, causes the roller 206 to ride along the interior surface of an upper transceiver casing member 214 shown in broken lines. The casing member 214 pushes against the roller 206 tending to rotate the head 16 clockwise, forward and down toward the drum 12 to force the surface 202 against the document carried by the drum 12, thereby assuring the proper spacing between the fiber optics 36 and the document.

Figure 20:
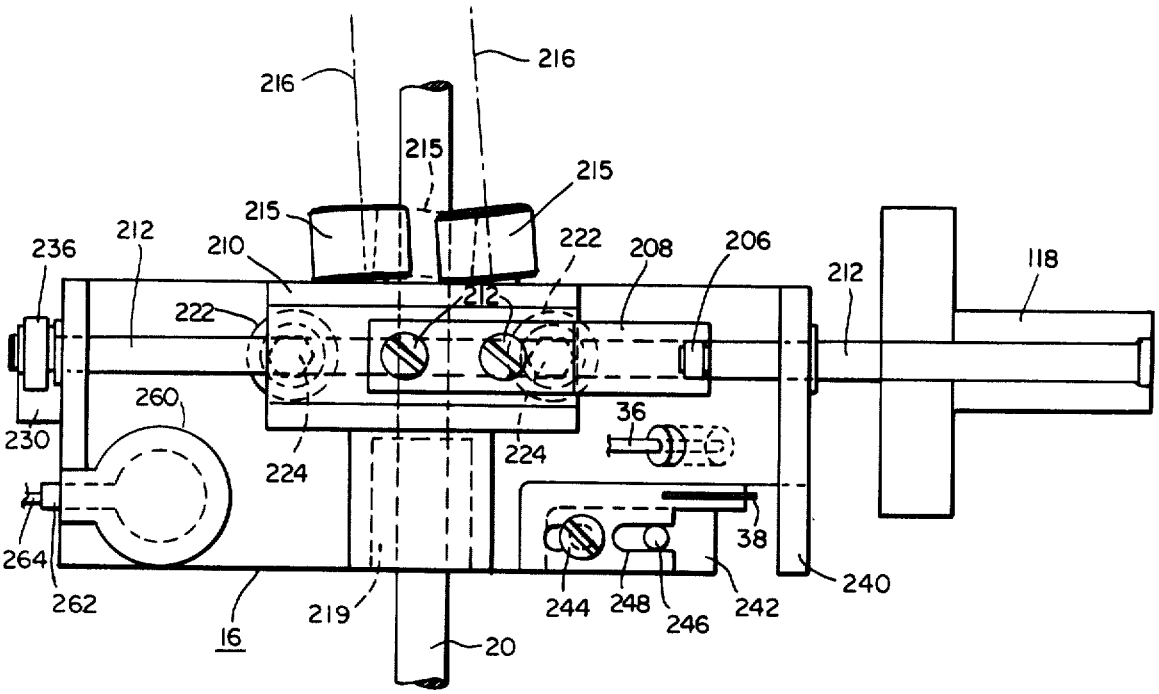
FIG. 20 is a top view of the scanning head shown in FIG. 19.
Figure 24:
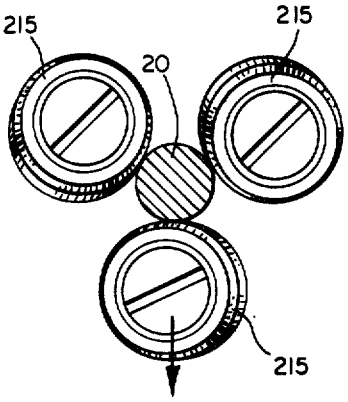
FIG. 24 is a view of the scanning head drive mechanism taken along line 24—24 of FIG. 21.
Figure 21:
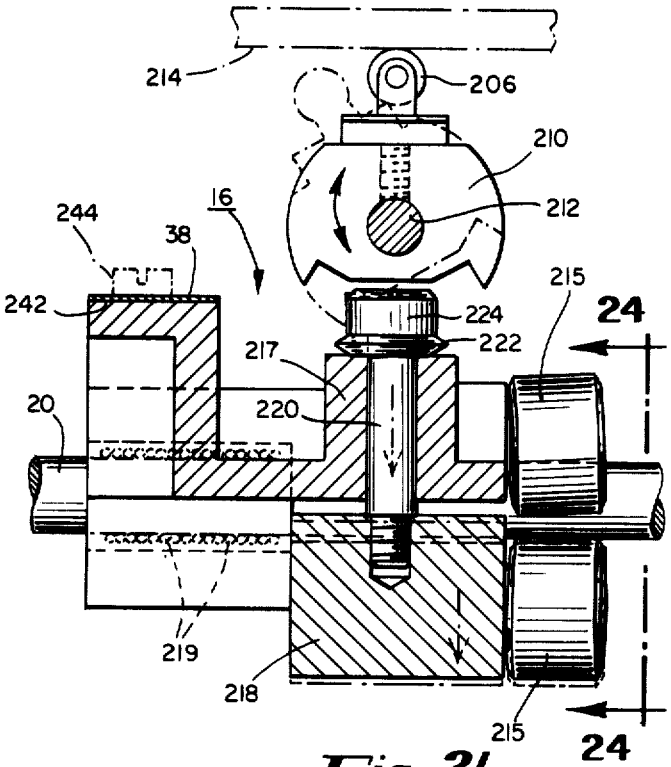
FIG. 21 is a sectional view taken along section line 21—21 of FIG. 19.

The drive mechanism for the head 16 which advances the head as the shaft 20 rotates comprises a plurality of skewed rollers or cam followers 215 which engage the shaft 20 at different angular positions, as shown in FIG. 24. By skewing the axis 216 of each of the rollers 215 with respect to the shaft 20 as best shown in FIG. 20, rotation of the smooth rollers 215 by shaft 20 in turn advances the head 16 along the shaft 20. In order to provide for this advancement, each of the axes 216 is skewed a very small angle in a plane parallel to the plane of tangency between the roller 215 and the shaft 20. In order to optimize the resolution of the facsimile system, the head 16 must be advanced very slowly and this calls for a very small angle of skewing, preferably less than one degree. In this manner, a single shaft 20 is able to drive as well as support the head 16 without the need for an additional drive shaft. Bearings 219 are also provided in the head 16 at the end opposite the rollers 215 to journably mount the shaft 20 in the head.

In order to permit the head 16 to be easily, manually advanced axially along the drum 12, the rollers 215 are mounted so as to permit them to disengage the shaft 20. In this connection, two of the rollers 215 are supported by a head member 217 which forms the upper and principal portion of the head 16 above the shaft 20, and a third roller 215 is supported by a relatively movable head member 218 which forms the lower portion of the head below the shaft 20. Fasteners 220 extend through holes in the upper head member 217 and thread into engagement with the lower head member 218. In order to bias the rollers 215 into contact with the shaft 20, compressible rings 222 are provided between the head 224 of the fasteners 220 and adjacent surfaces of the upper head member 217. The rings 222 then serve to urge the member 217 downward and the member 218 upward thereby forcing the upper rollers 215 toward the lower roller 215 which in turn results in engagement between the rollers 215 and the shaft 20.

Figure 22:
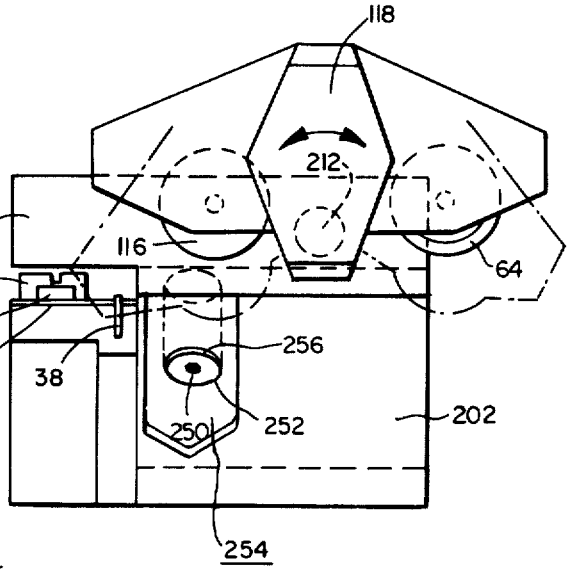
FIG. 22 is an end view of the scanning head of FIG. 19 taken along line 22—22.

When it becomes desirable to move the head 16 along the drum 12, the knob 118 is twisted in a clockwise or counterclockwise direction. This will rotate the shaft 212 to which the knob 118 is secured and in turn causes rotation of the cam 210 secured to the control shaft 212 to a position of engagement with the tops of the heads 224 as shown in broken lines in FIG. 21. This in turn will compress the rings 222 as the threaded fastener 220 is forced downwardly thereby separating the upper rollers 215 from the lower roller 215 to disengage the shaft 20. Once the rollers have been disengaged from the shaft 20, the head 16 may move more freely along the shaft to permit the copy medium to be severed by the roller 64. However, it is possible to move the head 16 without twisting the knob 118 since the rollers 215 will slide on the shaft 20. In the alternative, the knob 118 may be twisted in a counterclockwise direction which also serves to disengage the rollers from the shaft 20 to allow the head 16 to be repositioned with the soft roller 116 disposed as shown in FIGS. 19 and 22 for movement axially along the drum. Twisting of the knob 118 also releases the bias on the head which forces the surface 202 toward the drum by rotating the roller 206 away from the surface 214 thereby allowing the head to slide more easily along the shaft 20 with the stylus separated from copy medium.

Figure 23:
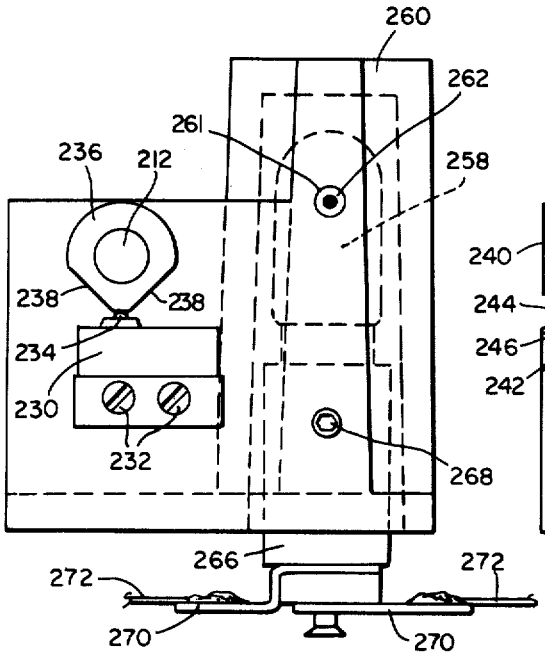
FIG. 23 is an end view of the scanning head of FIG. 19 taken along line 23—23.

Another important aspect of the head 16 involves the use of the shaft 212 to open and close a switch which controls the application of power to the stylus 38. In this connection, FIGS. 19 and 23 show a pressure-actuated switch 230 secured to the rear of the head 16 by screws 230. The switch 232 includes an actuatable member 234 which projects into contact with a cam 236 attached to the end of the control shaft 212. Whenever the control shaft 212 is rotated by twisting the knob 118 corresponding to manual movement of the head 16, the actuable projection 234 will be allowed to rise as cam surfaces 238 of cam 236 move into contact therewith (see FIG. 23) and this interrupts the application of power to the stylus 38. Thus, when the head must be handled by an operator to adjust its position, the power to the stylus is interrupted so that any contact between the operator's fingers and the stylus would not be injurious to the operator. In addition, the stylus 38 is recessed behind a member 240 as best shown in FIGS. 19 and 20. As also shown in these figures, the stylus 38 is mounted on a shelf 242 of the upper head member 217. However, to properly position the stylus 38 on the shelf 242, a screw 244 extends down into the shelf and an integral projection 246 extends into a slot 248 of the stylus 38 which permits adjustment of the stylus relative to the roller.

Referring now to FIG. 22, the surface 202 rides on the document carried by the drum 12 so as to maintain the appropriate spacing between the end 250 of the fiber optics 204 and the document carrier by the drum 12. In accordance with the invention disclosed in my aforementioned copending application Ser. No. 333,615, the ends 250 of the fiber optics 36 extend slightly beyond the base 252 of the recess 254 in the surface 202. This prevents the collection of dirt on the ends 250 of the fiber optics 36 since the dirt tends to collect around a fiber optic protective jacket 256 which surrounds the fiber optics 36 rather than on the ends 250 of the fiber optics themselves. Note that the fiber optic spacing from the document carried by the drum 12 is maintained since the recess 254 is deeper in the surface 202 than the overall protrusion of the ends 250 of the fiber optics from the base 252 of the recess 254.

In order to illuminate the area of the document being scanned, the bundle of fiber optics 36 is optically coupled to a light source 258 enclosed within a housing 260 located at the rear of the head 16. As shown in FIGS. 19 and 23, a jacket 262 extends through an opening 261 in the housing 260 which receives a bundle of illuminating fiber optics 264. At least one additional fiber optic extending into the recess 254 is provided for detecting the way in which the light from the illuminating fiber optics is absorbed, emitted or reflected from the document being scanned by the head 16. This detecting fiber optic is then coupled to a suitable photodetector such as a photodiode or phototransistor. The illuminating fiber optics which extend between the light source 258 and the recess 254 have not been shown nor has the detecting fiber optic which extends from the recess 254 to the photodetector, since this forms the subject matter of my aforementioned copending application.

As shown in FIG. 23, the light source 258 comprises a bulb mounted in a socket 266 which is secured to the housing 260 by a fastener 268. The socket 266 includes terminals 270 which are connected to a suitable power source by leads 272.

In the foregoing specification, a mechanical structure has been described which permits the transceiver to operate in both a transmitting mode and a receiving mode. The circuitry of the transceiver which permits operation in both modes will now be described with reference to FIG. 25. As shown there, a drum 12T is rotated by a motor 10T at a transceiver unit constructed in accordance with this invention while the document carried by the drum 12T is being scanned. As the head (not shown in FIG. 25) is advanced axially along the rotating drum 12T, successive paths on the document are illuminated by the illuminating fiber optics and the variations in light intensity due to the reflectivity and transmissivity of the document are sensed by the fiber optic detection or reading bundle and coupled to the photodetector 300. The photodetector 300 converts these variations in light intensity which are a function of the reflectivity or transmissivity of the scanned document into electrical signals. These electrical signals are amplified at a preamplifier 302 and utilized to control a VCO (voltage control oscillator) 304 to generate frequency modulated signals representing the information content of the document carried by the drum 12T. The frequency modulated signals are then amplified by a driver 306 before being applied to an acoustical coupler 308 which is associated with a conventional telephone handset 310.

The frequency modulated carrier is transmitted by suitable means such as conventional telephone lines 312 to another transceiver which is coupled to another conventional telephone handset 314 and an associated acoustical coupler 316. This transceiver includes a preamplifier 318 for amplifying the frequency modulated carrier and a clipper 320 which eliminates variations in the amplitude of the frequency modulated signal.

In accordance with the invention of Herbert P. Ford, Jr. which forms the subject matter of the aforementioned copending application Ser. No. 332,925, the clipped, frequency modulated signal is received and applied to a phase locked loop 322 including a voltage controlled oscillator 324 and a balanced detector in the form of a doubly-balanced modulator 326 having a pair of balanced inputs with the frequency modulated signal from the clipper 320 applied to one input and the output of the voltage controlled oscillator which is coupled to the output of the balanced modulator 326 applied to the other input. A notch type filter 328 is coupled to the output of the phase locked loop 322, which in this embodiment, attenuates frequencies at the 3,000–4,800 Hz. range. Since, in this embodiment, the maximum fundamental frequency of the frequency modulated signal is 1,500 Hz. due to the limitations of conventional telephone lines 312 and the phase locked loop including the balanced modulator 326 inherently doubles that frequency, the notch filter 328 is effective to remove the fundamental frequency of the frequency modulated signal from the demodulated DC signal which is applied to a stylus driver 330. However, the filter 328 does not attenuate those frequencies approaching 1,500 Hz. frequencies which correspond to rapid fluctuations in the demodulated DC signal as required for rapid transmission of and high resolution in the copy which is formed by marking on a copy medium with a stylus 332 as the copy medium is moved by rotating a drum 12R by motor 10R while the head moves to scan successive paths on the copy medium.

Figure 25:
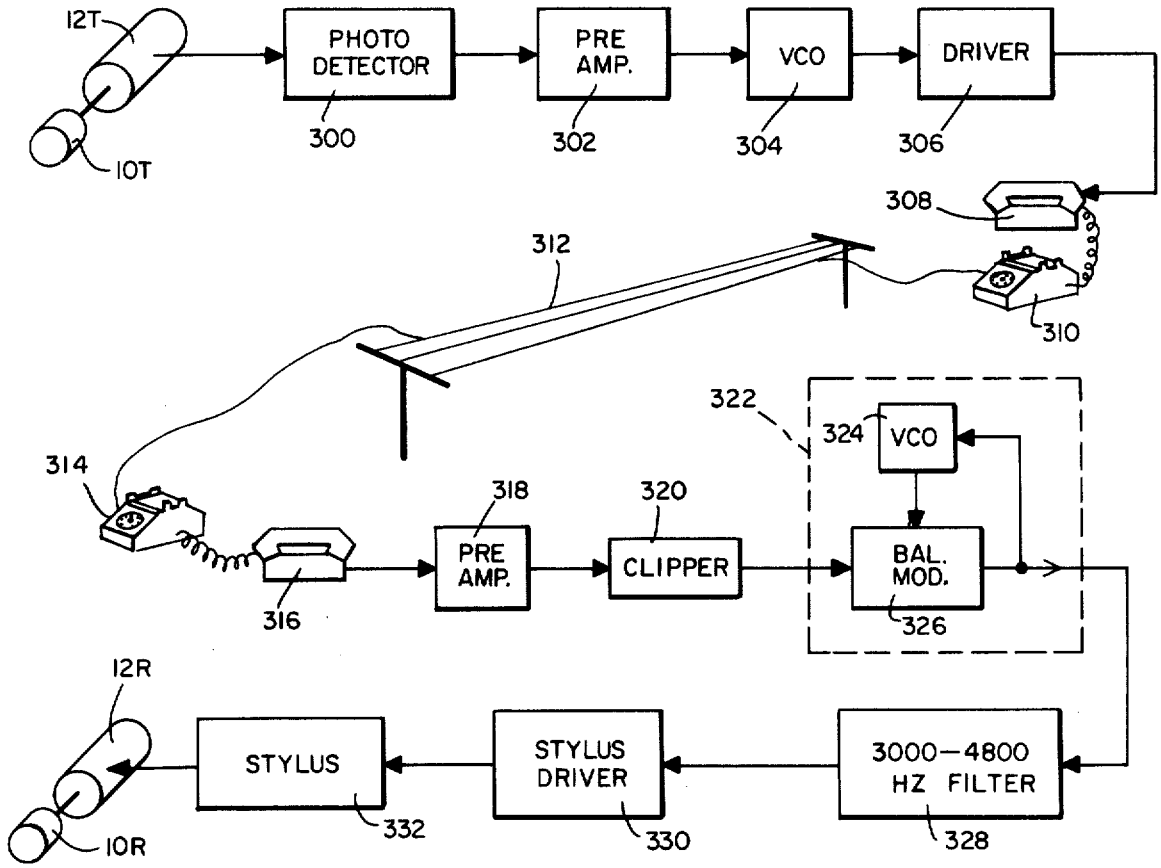
FIG. 25 is a block diagram of a facsimile system including block diagrams of the transmitter and receiver circuitry which may be utilized in a preferred embodiment of the invention.
Figure 27A:
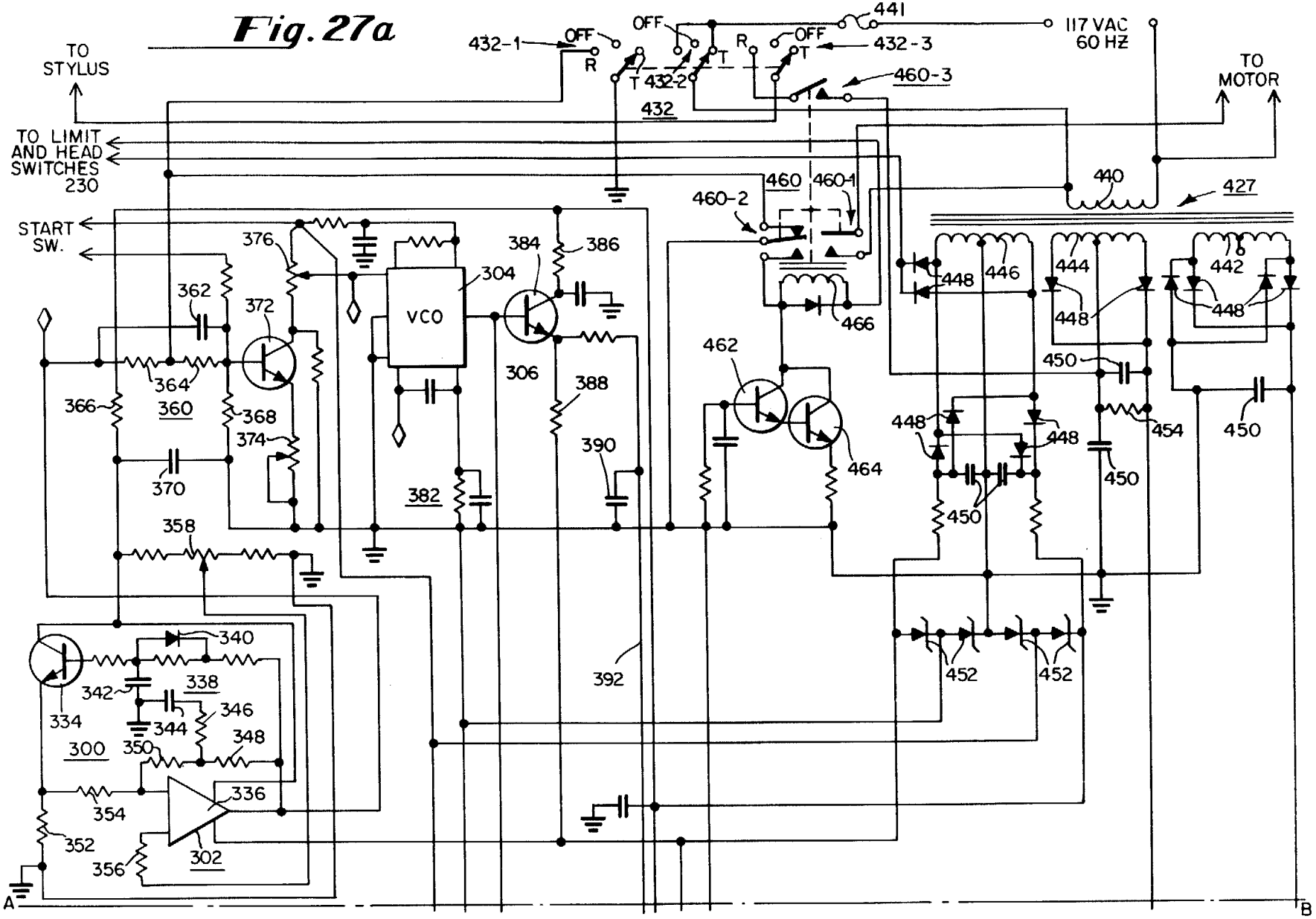
FIGS. 27 (A & B) are detailed schematic circuit diagrams for the circuitry shown in FIG. 26 where the circuitry is interconnected alone line A-B.
Figure 27B:
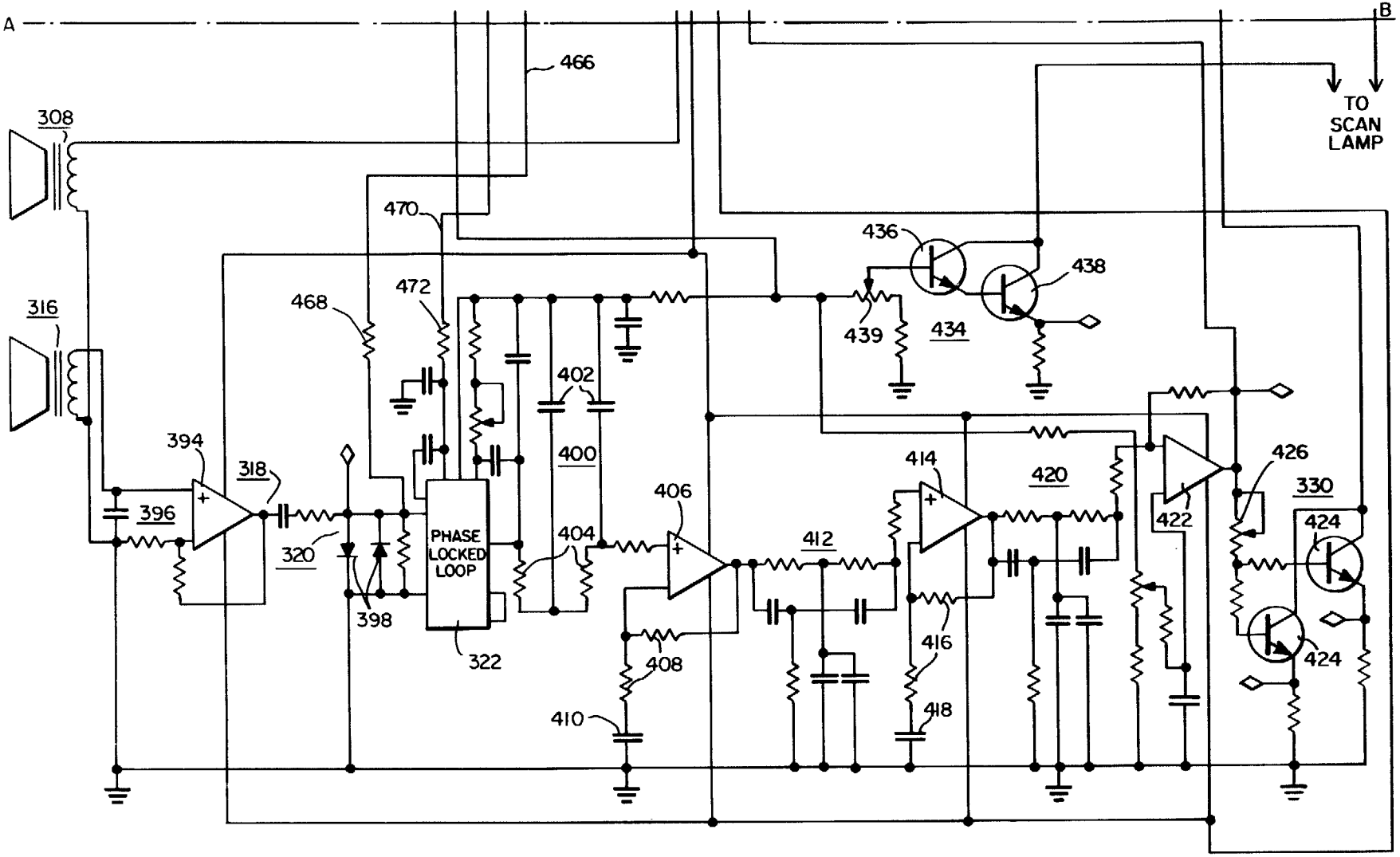

Referring now to FIGS. 27a and 27b, the circuitry disclosed in block diagram form in FIG. 25 will now be described in somewhat more detail. The photodetector 300 comprises a phototransistor 334 having its emitter connected to the inverting terminal of an operational amplifier 336 in the preamplifier 302. The base of the transistor 334 is connected to the output of the operational amplifier 336 through a soft clamp circuit 338 which includes a diode 340 and a capacitor 342. When white is detected at the document causing the phototransistor 334 to conduct, the capacitor 342 is charged. When black is detected, the phototransistor 334 does not conduct and the diode 340 prevents the feedback from the operational amplifier 336 from discharging the capacitor 342 thus causing a generalization of white peaks. A high frequency peaking circuit comprising a capacitor 344 and a resistor 346 is also provided. The resistor 346 is connected to feedback resistors 348 and 350 which, along with resistors 352, 354 and 356 determine the DC level corresponding to white. This DC level may be adjusted by a preamplifier bias control comprising a potentiometer 358.

The DC signal representing black or white (or the various levels of gray in between) is then applied to a high frequency peaking circuit 360 comprising a capacitor 362 connected in parallel with resistors 364. The high frequency peaking circuit also comprises resistors 366, 368 and a capacitor 370. The output of the high frequency peaking circuit is applied to the base of a transistor 372 which is on when a black signal of +1.5 volts is applied to its base and is off when a white signal of 0.5 volts is applied to its base. Black limit and white limit potentiometers 374 and 376 are provided in the emitter and collector circuits respectively of the transistor 372.

When the transistor 372 is off corresponding to a white signal, the VCO 304 is appropriately biased so as to run at a frequency of 1,500 Hz. When the black is detected in the photodetector 300 and the transistor 372 is on, the VCO is appropriately biased to run at a frequency of 2,400 Hz. When various levels of gray are detected, the frequency lies between 1,500 and 2,400 Hz. The VCO has been shown in block diagram form since the circuitry of an appropriate VCO is well known and may be purchased in integrated circuit form. In this connection, the VCO of the NE 565 integrated circuit phase locked loop manufactured by Signetics Corp. has been found to be particularly suitable. As shown in FIG. 27a, a power supply filter 382 is utilized in conjunction with the VCO 304.

The output of the VCO 304 is applied to the base of a transistor 384 of the driver 306 which is connected in an emitter follower configuration. The collector and emitter of the transistor 384 are appropriately biased by resistors 387 and 388 with a capacitor 390 being provided to equalize the response at the high and low frequencies provided by the VCO 304. The output from the driver transistor 384 is applied over line 392 to the acoustical coupler 308 for transmission over the line 312 shown in FIG. 25. When the transceiver is operated in a receiving mode, the acoustical coupler 316 will convert the acoustical signal to an electrical signal which is applied to an operational amplifier 394 of the preamplifier 318 which includes an RC network 396 for equalizing the response for frequencies from 1,500 to 2,400 Hz. Variations in the amplitude of the signal at the output of the operational amplifier 394 are eliminated by diodes 398 of the clipper circuit 320. After clipping, the 1,500–2,400 Hz. signals are applied to the phase locked loop 322 which is shown in a block diagram form. Once again, the phase locked loop may be an integrated circuit form and the NE 565 chip manufactured by Signetics Corp. has been found to be particularly well suited for this purpose.

In order to eliminate the sharp edges on the double frequency square wave signals at the output of the phase locked loop 322, a ladder filter 400 is provided. The filter 400 which includes capacitors 402 and resistors 404 is connected to the input of the notch filter 328 which removes high frequency, 3,000–4,800 Hz. components which correspond to doubling the harmonic frequency of the 1,500–2,400 Hz. signals applied to the phase locked loop 322.

The filter 328 comprises a first operational amplifier 406 having its non-inverting terminal connected to the output of the ladder filter 400. A 1,000 Hz. peaking circuit comprising resistors 408 and a capacitor 410 are connected to the inverting terminal of the operational amplifier 406. The output of operational amplifier 406 is connected to a filter network 412 which is effective to substantially attenuate frequencies in the range of 4,800 Hz. The output from the network 412 is applied to another operational amplifier 414 having a 1,000 Hz. peaking circuit comprising resistors 416 and a capacitor 418. Another filter network 420 is provided at the output of the operational amplifier 414 for substantially attenuating frequencies in the range of 3,000 Hz. The output of this network is applied to the inverting terminal of another operational amplifier 422 which has a DC gain of approximately 10.

The signal is then applied to the driver 330 which is a current generator comprising transistors 424 having their bases coupled to the output of the operational amplifier 422 through a base current limiting potentiometer 426. Preferably, the potentiometer 426 is set so that 0 volts corresponds to white and 4 volts corresponds to black. The output at the collectors of the transistors 424 is connected in series with the stylus power supply. The stylus current is then applied to the stylus through contacts 432–3 of function switch 432 when the switch is in the receiver or R position.

The transceiver also includes a constant current supply 434 which is utilized to drive the lamp or light source 258 for illuminating the document being scanned when the transceiver is operating in the transmitting mode. The constant current supply comprises transistors 436 and 438 connected in a Darlington configuration with the base of the transistor 436 connected to the potentiometer 439 to permit the adjustment of the lamp current. The use of a constant current source permits the illumination of a document to be maintained substantially constant without regulating the voltage of the lamp.

The power supply 427 is substantially conventional. A primary 440 is connected to a 117 volt AC, 60 Hz. power supply through a fuse 441 and a function switch contacts 432–2 when the switch is in the receive (R) or transmit (T) mode. The power supply 427 comprises three secondaries 442, 444 and 446. Each of these secondaries 442, 444 and 446 are connected to diodes 448 for obtaining DC supply voltages. The power supply 427 includes filter capacitors 450 and a series of Zener diodes 452 for regulating the bias levels for the circuitry of the transceiver. A resistor 454 is connected in parallel with the filter capacitor 450 which is in turn connected in series with the stylus driver 330 and the stylus.

In order to control the application of power to the transceiver motor, a switch 460 is provided comprising switch contacts 460–1, 460–2 and 460–3. When the transceiver is not operating, the contacts of the switch 460 assume the position shown in FIG. 27a where the function switch 432 is shown in the transmit position. In order to start the motor, a surge of current is generated by transistors 462 and 464 in response to the output of the operational amplifier 422. This energizes a switch coil 466 which closes contacts 460–1 and 460–3 and moves the blade of switch 460–2 to the other position. The switch contacts 460–1 close the circuit to the motor while the switch contacts 460–2 close the circuit through the coil 466 to permit the motor to continue to run even though no surge of current is provided by the transistors 462 and 464. When the transceiver is acting as a receiver, the function switch is in the R position and the contacts 460–3 are closed to apply current to the stylus. Note that the head switch 230 is connected in series with the coil 466 to interrupt the power to the stylus by opening the switch contacts 460–3 whenever the knob 118 is turned or whenever an end-of-travel limit switch (not shown) is triggered.

The operation of the transceiver circuitry will now be described both in respect to a transmitting transceiver as well as a receiving transceiver. At the transmitter, the function switch 432 is placed in a transmitting mode shown in FIG. 27a and a start switch is momentarily closed which applies a signal to the base of the transistor 372 which corresponds to a black signal from the preamplifier 302. As a result, the output from the VCO 304 increases to a frequency of 2,400 Hz. and this signal is applied to the input of the phase locked loop 322 over a line 470 and a resistor 472 in the receiving portion of the transmitting transceiver. The phase locked loop converts the 2,400 Hz. signal to a DC level corresponding to black. This in turn is applied to operational amplifier 422 to trigger the transistors 462 and 464 of the current generator associated with the coil 466 and thereby close switch 460–1 to apply power to the motor of the transmitting transceiver.

At a receiving transceiver, the function switch 432 is in the receive or R position. The black signal which is generated by the transmitting transceiver is applied to its acoustical coupler 308 and in turn received by the acoustical coupler 316 of the receiving transceiver. After amplification by the preamplifier 318, the black signal is demodulated at the phase locked loop 322, filtered and applied to the amplifier 422 of the receiving transceiver to trigger the transistors 462 and 464 associated with its own switch coil 466. As the result, the switch contacts 460–1 are closed in the receiving transceiver to apply power to the transceiver's motor.

It should therefore be clear that the motors of the transmitting and receiving transceivers will start at approximately the same time but there is no synchronizing of positions of the drums 12T and 12R driven by the motors nor is there any necessity for such synchronization in position since the copy medium forms a closed loop on the drum and the margin of the copy can therefore be suitably located before removing the copy medium from the drum regardless of the initial relative positions of the drums 12T and 12R. By utilizing synchronous motors 10T and 10R which operate at a given frequency, e.g., 60 Hz., the speed of the drums may be maintained sufficiently close to assure a good copy of the original document through stability of frequency of the utility grid.

As the transmission proceeds, dark light variations on the original document will be detected and transmitted from the transmitting transceiver to the receiving transceiver. As indicated in the foregoing, black signals have a predetermined frequency of 2,400 Hz. while white signals have a predetermined frequency of 1,500 Hz. It will of course be appreciated that any document being scanned will have varying degrees of darkness and lightness. The transceiver circuitry shown in FIGS. 27a and 27b is capable of detecting these varying degrees of lightness and darkness and transmitting frequencies between 1,500 Hz. and 2,400 hz. Thus a gray scale is provided to assure a faithful reproduction of the original document at the copy medium.

Figure 26:
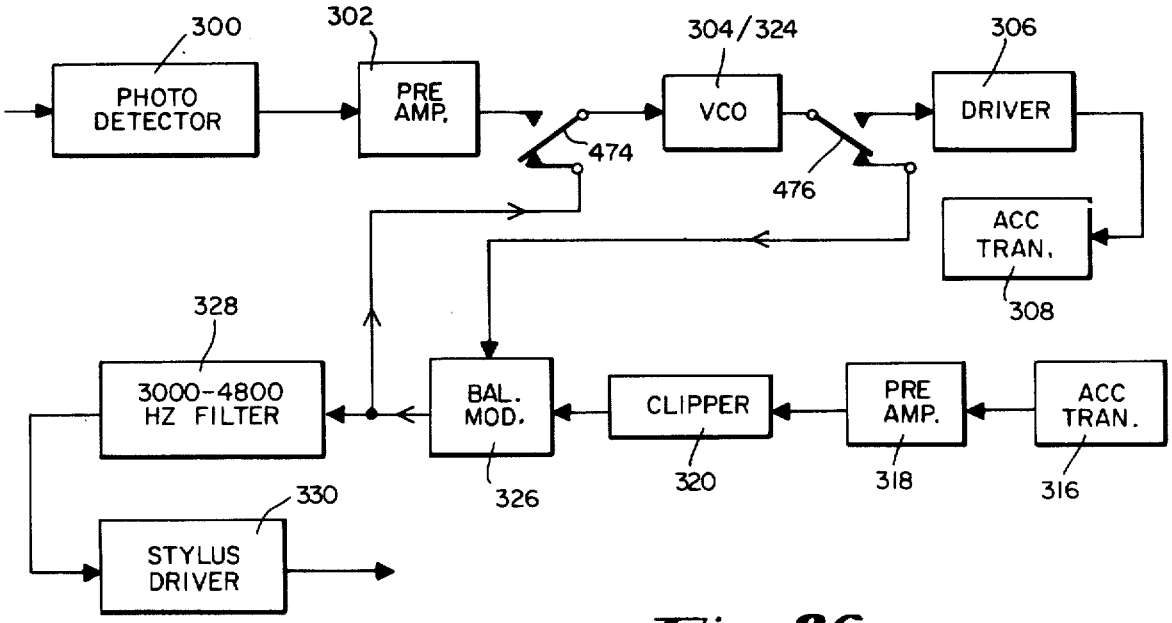
FIG. 26 is a block diagram of transceiver circuitry which is capable of operating in a transmit or receive mode.

As shown in FIGS. 27a and 27b, the VCO 304 in the transmitting portion of the transceiver and the VCO 324 in the receiving portion of the transceiver, are separate and distinct. In accordance with another important aspect of the invention disclosed in the aforesaid copending application Ser. No. 332,925, the VCO 304 and the VCO 324 may be one in the same as shown in FIG. 26 where the reference characters of FIG. 25 are utilized to identify the same components. By providing suitable switch means 474 and 476, the combined voltage controlled oscillator 304–324 may be utilized to modulate as well as demodulate the light-dark signals. When the transceiver is operating in the receiving mode, the switches 474 and 476 are in the position shown so as to place the VCO 304/324 in a feedback loop of the doubly balanced modulator 326 so as to demodulate the frequency modulated signal received. The resulting phase locked loop still serves to permit the notch filter 328 to substantially attenuate the signals in the 3,000–4,800 Hz. range without adversely affecting the high frequency changes in DC level of the signals applied to the stylus driver 330.

Although the transmitting and receiving transceivers have been described as identical, it will be understood that a receiving transceiver constructed in accordance with this invention is capable of operating with a different type of transmitting transceiver such as the Model 400 Telecopier facsimile transceiver manufactured by the Xerox Corporation. Such a facsimile transceiver does require synchronization signals and it is therefore only possible to utilize the transceiver of this invention as disclosed herein to transmit to such a transceiver if a continuous loop of copy medium is utilized at the receiver and/or pseudo synchronization signals are transmitted to the transceiver.

Although the copy medium has been described as electrosensitive and capable of being marked on in resonse to the current applied at the stylus of the writing means, other types of copy medium and writing means may be utilized. For example, the copy medium may be marked on in response to the heat generated by the stylus at the contact point. This is known as thermal printing, or the stylus may be maintained in mechanical contact with the paper, thus printing through a carbon between the stylus and the paper or rupturing dye containing capsules on the paper surface commonly known as NCR paper. Also, a modulated light source, such as a light emitting diode may be utilized which is focused on a photo- or thermally or ultra-violet sensitive paper.

Although a specific embodiment of the invention has been shown and described, other embodiments and modifications may occur to those of ordinary skill in the art, and the appended claims are intended to cover any such modifications which fall within the true spirit and scope of the invention.

What is claimed is:

1. In a facsimile system comprising a transmitter, a receiver and a communications network therebetween; said transmitter including reading means for detecting the information content of an original document, transmitter scanning means for moving said original document relative to said reading means along successive scanning paths, signal transmission means responsive to said reading means for generating signals representing the information content of said original document; said receiver comprising means for writing on a copy medium juxtaposed to said writing means, *a drum for supporting the copy medium thereon,* receiver scanning means for moving said copy medium *supported by said drum* relative to said writing means along successive scanning paths, and signal receiving means responsive to said signals generated by said signal transmission means for activating said writing means to reproduce the information content of said original document on said copy medium; the improvement residing in said copy medium comprising:

a closed loop of material moved relative to said writing means by said scanning means such that a continuous writing surface is juxtaposed to said writing means thereby eliminating the necessity for synchronizing the initial relative positions of said original document and said reading means in a scanning path with the initial relative positions of said copy medium and said writing means in a corresponding scanning path; *and*

*means for cutting said copy medium on said drum so as to break said closed loop after completion of the transmission along a line substantially corresponding with an edge of the original document.*

[2. The system of claim 1 wherein said receiver scanning means comprises a cylindrical drum rotatable about the axis of said drum, said copy medium forming a closed loop around the surface of said cylindrical drum.]

3. The system of claim [2] *1* wherein said first cylindrical drum comprises a slot extending substantially axially along the surface thereof and clamp means operably associated with said slot, for receiving a portion of said copy medium to hold said copy medium in place on said cylindrical drum.

4. The system of claim [2] *1* wherein said transmitter scanning means comprises another cylindrical drum rotatable about the axis of said other drum, said original document forming an open loop around the cylindrical surface of said other cylindrical drum.

5. The system of claim 4 wherein said transmitter scanning means and said receiver scanning means comprise synchronous motors for driving both of said cylindrical drums at substantially constant speeds.

[6. The system of claim 1 further comprising means for cutting said copy medium so as to break said closed loop after completion of a transmission.]

7. The system of claim [6] *1* wherein said cutting means is mounted on said writing means so as to permit movement between a position of engagement with said copy medium for cutting and a position spaced from said copy medium during writing.

8. The system of claim 7 wherein said [receiver scanning means comprises a cylindrical] drum *is* rotatable about the axis of said drum, said writing means being mounted for generally linear motion along a line parallel with the axis of said drum, said cutting means comprising a cutting surface for severing said closed loop of material along a line generally parallel to the drum axis.

9. The system of claim 8 wherein said drum comprises a surface having a plurality of grooves extending substantially parallel with the axis of said drum and cooperating with said cutting means when engaged so as to guide said cutting means along a line parallel with the axis of said drum.

10. In a facsimile system comprising a transmitter, a receiver and a communications network therebetween; said transmitter including reading means for detecting information content of an original document, transmitter scanning means for moving the original document relative to said reading means along successive scanning paths, and signal transmission means responsive to said reading means for generating signals representing the information content of the original document; said receiver comprising means for writing on a copy medium juxtaposed thereto, *a drum for supporting the copy medium thereon* receiver scanning means for moving said copy medium *supported by said drum* relative to said writing means along successive scanning paths, and signal receiving means responsible to said signals generated by said signal transmission means for activating said writing means to reproduce the information content of said original document on said copy medium, the improvement comprising:

a copy medium forming a closed loop of material moved relative to said writing means by said scanning means such that an effectively continuous writing surface is juxtaposed to said writing means;

means for initiating scanning of the original document regardless of the original position of the copy medium relative to said writing means; and means for scanning the copy medium independently of any periodic position synchronizing control signal from said transmitter; *and*

*means for cutting said copy medium on said drum so as to break said closed loop after scanning along a line substantially corresponding with an edge of the original document.*

11. In a facsimile system comprising a transmitter, a receiver and a communications network therebetween; said transmitter including a reading means for detecting information content of an original document, transmitter scanning means including a rotatable drum for moving the original document relative to said reading means along successive scanning lines, and signal transmission means responsive to said reading means for generating signals representing the content of the original document; said receiver comprising means for writing on a copy medium juxtaposed thereto, receiver scanning means including a receiver rotatable drum for moving said copy medium relative to said writing means along successive scanning lines, and signal receiving means responsive to said signals generated by said signal transmission means for activating said writing means to reproduce the information content of said original document on said copy medium, the improvement comprising:

a copy medium comprising a closed loop of material extending along the surface of the receiver rotatable drum; [and]

means for initiating scanning of said original document independently of the initial relative angular positions of said transmitter scanning drum and said receiver scanning drum; *and*

*means for cutting said copy medium on said drum so as to break said closed loop after scanning along a line substantially corresponding with an edge of the original document.*

12. The facsimile system of claim 11 wherein said means for driving said transmitter rotatable drum and said receiver rotatable drum comprises synchronous motors.

13. In a facsimile system comprising a transmitter, a receiver and a communications network therebetween; said transmitter including a reading means for detecting information content of an original document, transmitter scanning means including an angularly rotatable drum for moving the original document relative to said reading means along successive scanning lines, and signal transmission means responsive to said reading means for generating signals representing the original content of the original document; said receiver comprising means for writing on a copy medium juxtaposed thereto, receiver scanning means including an angularly rotatable drum for moving said copy medium relative to said writing means along successive scanning lines, and signal receiving means responsive to said signals generated by said signal transmission means for activating said writing means to reproduce the information content of said original document on the copy medium, the improvement comprising:

a copy medium forming a closed loop of material extending around the surface of the angularly rotatable receiver drum thereby eliminating the necessity for angular synchronization between said reading means of said transmitter and said writing means of said receiver; *and*

*means for cutting said copy medium on said drum so as to break said closed loop after scanning along a line substantially corresponding with an edge of the original document.*

14. A method of operating a facsimile system comprising a transmitter, at least one receiver and a communications network therebetween, said method comprising the following steps:

applying an original document to the surface of a transmitter scanning drum so as to form an open loop around the drum;

applying at least one copy medium to the surface of said at least one receiver scanning drum so as to form a closed loop around said receiver scanning drum;

concurrently initiating scanning of the original document carried by said transmitter scanning drum and said at least one copy medium carried by said at least one receiver scanning drum regardless of the initial relative angular positions thereof; and continuing scanning of said original document and said at least one copy medium while rotating said transmitting scanning drum and said at least one receiver scanning drum in mutually angularly synchronous modes; *and*

*removing said at least one copy medium of said at least one receiver scanning drum by breaking said closed loop along a line substantially corresponding with an edge of said original document.*

[15. The method of claim 14 including the step of removing the at least one copy medium of said at least one receiver scanning drum by breaking said closed loop so as to form a suitable margin for the information content of said copy medium.]

[16. The method of claim 14 wherein the breaking of said closed loop is accomplished by severing said copy medium along a line substantially corresponding with an edge of said original document.]

17. The method of claim 14 wherein the step of applying said copy medium to said receiver drum includes the step of forming an adhesive bond between two opposing edges of said copy medium so as to form said closed loop.

18. A facsimile receiver for generating a copy in response to received signals representing the information content of an original document, said receiver comprising means for writing on a copy medium juxtaposed to said writing means, scanning means for moving said copy medium relative to said writing means along successive scanning paths, signal receiving means responsive to the signals received by said receiver for activating said writing means to reproduce the information content of the original document on said copy medium, the improvement residing in said copy medium comprising:

a closed loop of material moved relative to said writing means by said scanning means such that a continuous writing surface is juxtaposed to said writing means; *and*

*means for cutting said copy medium so as to break said closed loop before removal from said receiver.*

19. The receiver of claim 18 wherein said scanning means comprises a cylindrical drum rotatable about the axis of said drum, said copy medium forming a closed loop around the surface of said cylindrical drum.

20. The receiver of claim 19 wherein said cylindrical drum comprises a slot extending axially along the surface thereof and clamp means operably associated with said slot for receiving a portion of said copy medium to hold said closed loop in place on said cylindrical drum.

[21. The system of claim 18 further comprising means for cutting said copy medium so as to break said closed loop after completion of a transmission.]

22. The system of claim [21] *18* wherein said cutting means is mounted on said writing means so as to permit movement between a position of engagement with said copy medium for cutting and a position spaced from said copy medium during writing.

23. The system of claim 22 wherein said scanning means comprises a cylindrical drum rotatable about the axis of said drum, said writing means being mounted for generally linear motion along a line parallel with the axis of said drum, said cutting means comprising a cutting surface for severing said closed loop of material along a line generally parallel to the drum axis.

24. The system of claim 23 wherein said drum comprises a surface having a plurality of grooves extending substantially parallel with the axis of said drum and cooperating with said cutting means when engaged so as to guide said cutting means along a line parallel with the axis of said drum.

25. A method of operating a facsimile receiver comprising the following steps:

applying a copy medium to the surface of a scanning drum so as to form a closed loop around said receiver scanning drum;

scanning the copy medium while rotating the scanning drum; and removing the copy medium from the scanning drum by breaking said closed loop so as to form a suitable margin for the information content on the copy medium.

26. The method of claim 25 wherein the breaking of said closed loop is accomplished by severing the copy medium along a line substantially corresponding with an edge of an original document.

27. The method of claim 26 wherein applying the copy medium to the scanning drum includes the step of forming an adhesive bond between *the* two opposing edges of said copy medium so as to form said closed loop.

* * * * *